Nov. 11, 1941.                    E. A. GODLEY                    2,262,278
           STATISTICAL UNIT AND APPARATUS FOR HANDLING THE SAME
                    Original Filed Feb. 28, 1940         3 Sheets-Sheet 1

Fig. 1

| STORE REPORT FOR 2 MONTH PER[IOD ENDING MAR]CH 31, 1939 | | | | | | | | |
|---|---|---|---|---|---|---|---|---|
| STORE | DEPT | SALES | MARKDOWNS | | SHORTAGE RESERVE | RETAIL | TORY ACTUAL | TURN RATE |
| | | | AMOUNT | % | | | | |
| 1 | 1 | 600 | 18 | 3 | 12 | 6 | 202 | 6.3 |
| 1 | 2 | 450 | 9 | 2 | 9 | 4 | 450 | 6.0 |
| 1 | 3 | 1200 | 60 | 5 | 36 | 12 | 902 | 4.1 |
| 1 | 4 | 3150 | 63 | 2 | 31 | 32 | 655 | 3.6 |
| 1 | 5 | 500 | 450 | 9 | 10 | .9 | 455 | 2.1 |
| 1 | 6 | 2400 | 144 | 6 | 48 | 24 | 109 | 5.4 |
| 1 | 7 | 1100 | 66 | 5 | 22 | 11 | 654 | 4.7 |
| 1 | 8 | 1450 | 29 | 2 | 21 | 14 | 467 | 5.2 |
| 1 | 9 | 700 | 42 | 6 | 7 | 7 | 115 | 8.6 |
| 1 | 10 | 850 | 34 | 4 | 25 | 9 | 546 | 11.1 |
| 1 | 11 | 250 | 20 | 8 | 7 | 2 | 650 | 2.6 |
| 1 | 12 | 100 | 8 | 8 | 2 | 1 | 965 | 4.8 |
| 1 | TOTAL | 12,750 | 943 | | 230 | 13.9 | 170 | 5.1 |

| STORE REPORT FOR 2 MONTH PER[IOD ENDING MARC]H 31, 1939 | | | | | | | | |
|---|---|---|---|---|---|---|---|---|
| STORE | DEPT | SALES | MARKDOWNS | | SHORTAGE RESERVE | RETAIL | TORY ACTUAL | TURN RATE |
| | | | AMOUNT | % | | | | |
| 1 | 1 | 600 | 18 | 3 | 12 | 6 | 202 | 6.3 |
| 1 | 2 | 450 | 9 | 2 | 9 | 4 | 450 | 6.0 |
| 1 | 3 | 1200 | 60 | 5 | 36 | 12 | 902 | 4.1 |
| 1 | 4 | 3150 | 63 | 2 | 31 | 32 | 655 | 3.6 |
| 1 | 5 | 500 | 450 | 9 | 10 | 9 | 455 | 2.1 |
| 1 | 6 | 2400 | 144 | 6 | 48 | 24 | 109 | 5.4 |
| 1 | 7 | 1100 | 66 | 5 | 22 | 11 | 654 | 4.7 |
| 1 | 8 | 1450 | 29 | 2 | 21 | 14 | 467 | 5.2 |
| 1 | 9 | 700 | 42 | 6 | 7 | 7 | 115 | 8.6 |
| 1 | 10 | 850 | 34 | 4 | 25 | 9 | 546 | 11.1 |
| 1 | 11 | 250 | 20 | 8 | 7 | 2 | 650 | 2.6 |
| 1 | 12 | 100 | 8 | 8 | 2 | 1 | 965 | 4.8 |
| 1 | TOTAL | 12,750 | 943 | | 230 | 13.9 | 170 | 5.1 |

Fig. 4

Inventor.
EDWIN A. GODLEY.
By A. B. Diller
Attorney.

Nov. 11, 1941.   E. A. GODLEY   2,262,278
STATISTICAL UNIT AND APPARATUS FOR HANDLING THE SAME
Original Filed Feb. 28, 1940   3 Sheets-Sheet 2

Fig. 5

| | | STORE | DEPT | SALES | MARKDOWNS AMOUNT | % | SHORTAGE RESERVE | TOTAL RETAIL REDU | TORY ACTUAL | TURN RATE | | |
|---|---|---|---|---|---|---|---|---|---|---|---|---|
| O | DEPARTMENTAL REPORT FOR 2 MONTH PERIOD TO DATE | | | | | | | | MARCH 31, 1939 | | | O |
| O | | 1 | 6 | 2400 | 144 | 6 | 48 | 2 | 2109 | 5.4 | | O |
| O | | 2 | 6 | 2600 | 182 | 7 | 52 | 2 | 2785 | 5.3 | | O |
| O | | 3 | 6 | 2800 | 168 | 6 | 56 | 3 | 2896 | 5.9 | | O |
| O | | 4 | 6 | 3000 | 210 | 7 | 60 | 3 | 3109 | 6.1 | | O |
| O | | 5 | 6 | 3200 | 192 | 6 | 64 | 3 | 3247 | 5.3 | | O |
| O | | 6 | 6 | 3600 | 252 | 7 | 72 | 3 | 3601 | 6.0 | | O |
| O | | 7 | 6 | 300 | 22 | 7 | 6 | 3 | 310 | 7.1 | | O |
| O | | 8 | 6 | 300 | 30 | 10 | 6 | 3 | 345 | 7.2 | | O |
| O | | 9 | 6 | 3000 | 330 | 11 | 30 | 3 | 3100 | 5.1 | | O |
| O | | 10 | 6 | 3200 | 384 | 12 | 32 | 3 | 3314 | 7.0 | | O |
| O | | 11 | 6 | 3400 | 306 | 9 | 34 | 3 | 3600 | 6.1 | | O |
| O | | 12 | 6 | 3600 | 324 | 9 | 36 | 3 | 3500 | 5.2 | | O |
| O | | 13 | 6 | 3800 | 304 | 8 | 76 | 4 | 3750 | 5.5 | | O |

Fig. 6

| O | | 1 | 6 | 2400 | 144 | 6 | 48 | 2 | 2109 | 5.4 | | O |
|---|---|---|---|---|---|---|---|---|---|---|---|---|

Inventor:
EDWIN A. GODLEY.
By A. H. Weller
Attorney.

Nov. 11, 1941.    E. A. GODLEY    2,262,278
STATISTICAL UNIT AND APPARATUS FOR HANDLING THE SAME
Original Filed Feb. 28, 1940    3 Sheets-Sheet 3
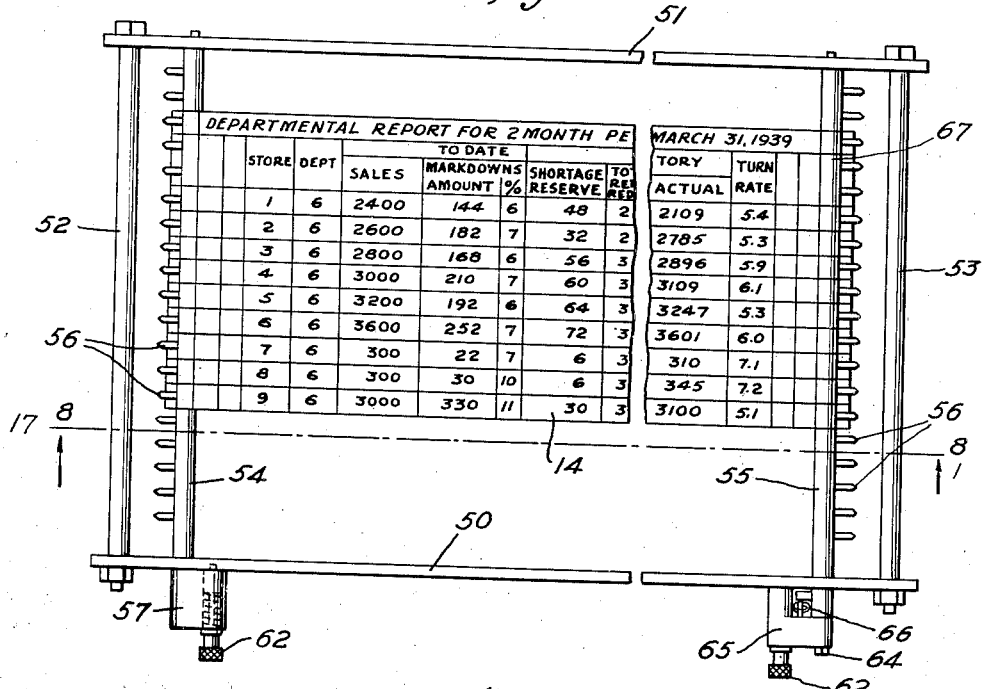
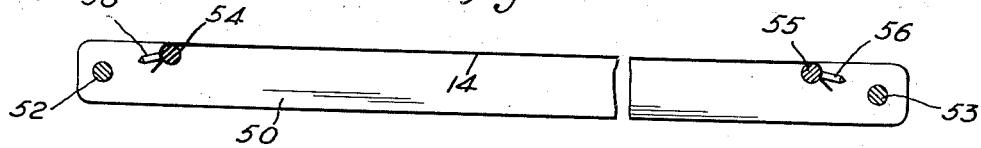
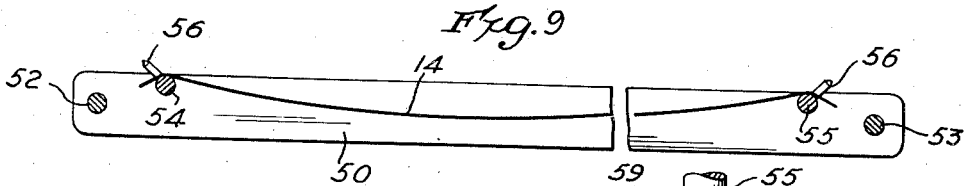
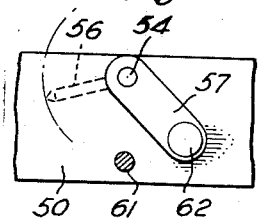 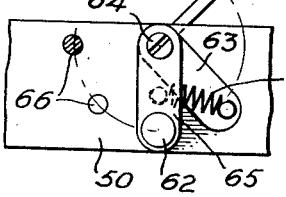
Inventor:
EDWIN A. GODLEY.
By A. R. Weller
Attorney.

Patented Nov. 11, 1941

2,262,278

UNITED STATES PATENT OFFICE 2,262,278

STATISTICAL UNIT AND APPARATUS FOR HANDLING THE SAME

Edwin A. Godley, New York, N. Y., assignor to S. D. Leidesdorf & Co., New York, N. Y., a partnership Original application February 28, 1940, Serial No. 321,151. Divided and this application August 19, 1940, Serial No. 353,176

7 Claims. (Cl. 40—63)

The present invention relates to statistical cards and units, and, more particularly, to separate statistical units, and to an apparatus for handling and reassembling such units in a substantially automatic manner.

The invention principally contemplates the preparation of reports of the type sent by a chain of stores to a main office at predetermined time intervals. As those skilled in the art know, generally each store of the chain consists of a series of different merchandise departments. The management of the chain generally requires that two types of reports be submitted of which the first is a report of the individual store classified by merchandise departments, and the second is a report of one department in the various stores having such merchandise. Accordingly, the first report would consist of a separate sheet for a single store, listing one after another the figures of the operations of the various departments and finally showing the figures of the store total. The second report would be a separate sheet for one department, listing the figures of the operations of such department in the various stores of the chain, one after another, with a total for the department for the entire chain.

It is an object of the present invention to provide a medium or unit of novel character for accumulating and transmitting statistical information of the described character to a central office and for converting such accumulated information into information rearranged in a predetermined manner.

It is another object of the present invention to provide a statistical card or sheet of a separable character on which information may be accumulated and hereafter the sheet may be separated into a plurality of reassemblable elements containing portions of such accumulated information.

It is a further object of the invention to provide a statistical card or sheet having a plurality of record-bearing lines which are temporarily connected to form a single unit for the convenient accumulation of intelligence and which are provided with incisions or weakened portions for readily detaching said record-bearing lines from each other.

The invention also contemplates an apparatus for handling and reassembling statistical units of the described character in a substantially automatic manner and without the assistance of specially skilled help and an apparatus for preparing hectographic copies of such reassembled units in a simple, direct and error-proof manner.

It is also within the contemplation of the invention to provide a complete system for the accumulation, transmittal, reassembly, copying and interpretation of statistical intelligence including separable sheets of novel character and apparatus for automatically handling such sheets, which is simple in character and in use and which may be manufactured and used on a practical and commercial scale at a low cost.

Other and further objects and advantages of the invention will become apparent from the following description taken in conjunction with the accompanying drawings, in which:

Fig. 1 illustrates a top elevational view of a set of sheets including a plain or primary sheet of novel character and a separable sheet embodying the principles of the present invention;

Fig. 2 depicts a vertical sectional view, somewhat diagrammatic in character, of the set of sheets illustrated in Fig. 1 and taken on line 2—2 of Fig. 1;

Fig. 3 shows a top elevational view of a separable sheet embodying the principles of the present invention;

Fig. 4 is a vertical sectional view, also diagrammatic in character, taken on line 4—4 of Fig. 3;

Fig. 5 illustrates a top elevational view of a sheet similar to the one shown in Fig. 3 after its various sections have been rearranged, the distance between such sections being slightly exaggerated for reasons of clarity;

Fig. 6 depicts a top elevational view of a single section or strip of the separable sheet shown in Fig. 3;

Fig. 7 illustrates a top elevational view of a pegging device for holding a plurality of sections or strips of the statistical units of the invention in predetermined position;

Fig. 8 depicts a vertical sectional view taken on line 8—8 of Fig. 7, the sections or strips bearing statistical information being in the tensioned or taut position;

Fig. 9 shows a similar view of the device showing the sections in the loose position;

Fig. 10 is a fragmentary side elevational view of one of the locking mechanisms of the device shown in Fig. 7 on a somewhat enlarged scale;

Fig. 11 is a similar view of the other locking mechanism of the device shown in Fig. 7; and Fig. 12 shows a top elevational view of the device shown in Fig. 11.

Broadly stated, according to the principles of the invention, I provide a suitable medium for accumulating and transmitting statistical information consisting of two parts, the first of which is a simple sheet of paper imprinted with suitable vertical and horizontal lines and suitable captions, and the other of which is a similar sheet of paper having the same dimensions, lines and captions and being provided with slits or weakened portions along its horizontal lines so that it can be readily separated into strips or sections of a single-line width. In the marginal portions of both the first or primary sheet and of the second or separable sheet there are provided holes in appropriate arrangement whereby said primary and separable sheets may be superposed one upon the other in a predetermined cooperative position for simultaneously entering information on both sheets. Hereafter, the separable sheet may be separated into individual portions of single line width and the individual portions may be rearranged to form a new sheet containing the information in a new arrangement, as it will be more fully explained hereinafter.

The invention will be best understood from one of its preferred embodiments illustrated in the drawings. Referring now more particularly to Figs. 1 and 2 of the drawings, essentially a primary sheet 1 and a separable sheet 2 are provided having a sheet of hectographic carbon paper 3 provided therebetween. Primary sheet 1 is constituted of an integral sheet of paper or similar sheet-like material having a plurality of writing lines 4 provided therein divided into boxes 5 by means of appropriate vertical lines. Each vertical row of boxes is provided with suitable captions 6 indicating the type of information to be entered into the box in question. The primary sheet shown in Fig. 1 exemplifies a sheet reporting the sales made in the various merchandise departments of one store of the chain. The various captions of the primary sheet read "Store," "Dept.," "Sales," "Markdown," etc., so that the sheet after being properly filled out by the store manager provides a record of the sales, markdowns, etc., of all of the merchandising departments of the same store during a predetermined time interval. The right hand marginal portions of primary sheet 1 are provided with a row of equidistantially spaced holes 7, one hole being provided for each writing line. These holes are adapted to cooperate with the pegs of the pegboard whereby proper alignment or collation of the primary sheet with a separable sheet may be assured.

The construction of the second or separable sheet will be best understood from Figs. 3 and 4 of the drawings. As it will be readily observed particularly from Fig. 3, the external appearance of the separable sheet is practically identical with that of the primary sheet in that it is divided into a plurality of writing lines 8 corresponding in dimensions and arrangement to writing lines 4 of the primary sheet, and vertical lines similar to those of the primary sheet are provided dividing the sheet into a plurality of boxes 9. Each vertical row of boxes is provided with suitable captions 10 similar to the captions of the primary sheet. A row of holes 11 is provided in each of the lateral marginal portions of the separable sheet, one hole being provided for each writing line, the holes being equidistantially spaced in the same arrangement as on the primary sheet. Due to the fact that all of the lines, captions and holes are provided in the same arrangement in both the primary and in the separable sheet, they may be superimposed upon one another by means of a peg board so that each box of the primary sheet will be directly above a corresponding box of the separable sheet.

While the primary sheet is constituted of an integral sheet of paper, the separable sheet is provided with a plurality of parallel-spaced incisions 12 which divide the same into a plurality of readily separable sections of single-line width. As it will be best observed in Fig. 3, these incisions extend throughout the full length of the writing lines and beyond holes 11 at each side of the separable sheet leaving, however, integral marginal portions 13 at each side, which retain the proper relative arrangement of the individual strips in which they were prior to the provisions of the incisions. The incisions are preferably provided at the printing shop by means of suitable dies, as those skilled in the art will readily understand. Separation of the sheet into individual sections of single-line width may be accomplished in a simple manner by cutting off the connecting marginal portions 13 at each side of the separable sheet whereby the individual sections 14 are freed from any connections with each other and are capable of being individually handled or rearranged. Fig. 6 illustrates one of these sections 14 of single-line width after its marginal portions have been cut off. As it will be observed from Fig. 6, the holes 11 are retained in the individual sections so that they may be placed on a pegboard for the purpose of reassembly.

From the foregoing description, the operation of the separable statistical units embodying the principles of the present invention will be readily understood by those skilled in the art. Before entering the statistical information required by the reports, the primary sheet and the separable sheet are placed upon a work board equipped with a peg strip at the right side thereof to insure proper alignment or collation of the two sheets. A sheet of hectographic carbon paper 3 is provided between the primary sheet and the separable sheet. Fig. 1 illustrates the arrangement of the primary sheet, hectographic carbon paper and separable sheet in the operative position, the primary sheet being at the top and the separable sheet being at the bottom of the set. Due to the fact that the set is merely held by one row of pegs, it is possible to lift up the left hand side of the primary and separable sheets for the purpose of inspecting or correcting the copy made by the hectographic carbon paper. Of course, the alignment or collation of the primary and separable sheets may be obtained by joining or binding the sheets together in some other appropriate manner in which case no work board or peg board is required at the time of the original entry.

It is preferred to use a hectographic pen or pencil for entering the statistical data on the primary sheet. The hectographic carbon paper between the primary and the separable sheet will duplicate the entries on the separable sheet so that in one writing the desired information is entered for both sheets. Since the printing on the strips constituting the separable sheet lines up exactly with that on the first, the two sheets, as filled out, are identical with each other.

After all of the statistical data have been entered, including the totals, if they are desired, the primary and the secondary sheets are separated from each other. The primary sheet is ready for running off the first type of report which, as it appears from Fig. 1, is, for example, a statistical report of the operation of a single store indicating the sales and the markdowns of each department, etc. This first type or report may be duplicated in the usual manner by means of a gelatin-type hectographic machine, the sheet being placed on the gelatin bed, face downwards. The rulings of the form and the statistics, both of which were prepared with hectographic printing ink, are transferred to the gelatin bed in the conventional manner and the desired number of copies of the report may then be run off. It will be noted in Fig. 1, that the primary sheet is provided with transverse lines 15 running in close proximity to and in parallel-spaced position with the lines separating the writing lines of the primary sheet from each other. These fine transverse lines are preferably printed in a color different from the other lines on the sheet and have the object of restricting the space or line into which the entries are to be made and to prevent the entries being in part made over the incisions 12 of the secondary sheets which are directly underneath the writing lines of the primary sheet. In this manner it is assured that the entires are made in the proper position and that incisions 12 in the secondary sheet do not interfere with the legibility of the entries made by the hectographic carbon paper neither before, nor after the single-line width portions are separated from each other.

The separable sheet is employed for the preparation of the second report. As it has been pointed out in the foregoing, the second report takes one division of the unit, such as a merchandising department of a store and shows the statistics of that division or department along with and in comparison with the corresponding divisions in other units or stores. This is accomplished by taking the separable sheet for all units or stores, separating each of said sheets into their individual strips and sorting the strips thus separated according to divisions. For example, if the reports are those of a chain of stores, the separable sheets of all of the stores of the chain have to be separated into strips and the strips have to be sorted according the departments.

Separation of one of the separable sheets into individual strips is accomplished simply by means of cutting off or tearing off marginal portions 13 of such sheets at a point between the holes and the ends of incisions 12. Tearing off may be facilitated by providing a weakened or perforated line in the desired position but in practical operation it will be generally preferred to employ a cutting machine of special character. The separable sheets embodying the invention may be separated into strips and sorted individually. This, however, is a slow and tedious operation which can be considerably accelerated and simplified by separating and sorting a group of separable sheets or all of the separable sheets of the chain in a single operation. In this case, the separable sheets of the several units are placed on top of each other in the same sequence as these units are to be listed in the second report. In this order the sheets are placed upon a suitable separating or cutting apparatus, having rows of pegs fitting into the holes punched along the margins of the sheets. Of course, it is of critical importance that all of the sheets be placed exactly on top of one another, using the same pegs for the corresponding holes of the sheets. After all sheets have been placed on the device, the sheets are separated into individual strips by cutting off the marginal portions thereof. Since the sheets were placed one upon another using the same pegs for corresponding holes, it becomes possible to withdraw a group or stack of strips at a time, the strips being for the corresponding division in each of the units and as the sheets were placed on the apparatus in the order in which the units were to be listed on the second report, the strips as withdrawn, are in exactly the desired sequence.

After the separable sheets have been separated into individual strips, the next step is reassembling such strips taking one stack or group of such strips. As the order of the strips in the group or stack is the same as the units are listed on the report, the strips may be placed into contiguous positions in a suitable pegging apparatus to be described hereinafter without the need of further resorting. After the operation has thus been completed, a wider strip 16 bearing the captions and one blank strip (not shown), may be added to the sheet on which the totals for the division may be entered. The physical appearance of the reassembled sheet obtained in accordance with the foregoing procedure is shown in Fig. 5 which represents a record sheet indicating the sales of the same merchandise division of all of the stores of the chain. As it clearly appears from Fig. 5, the reassembled sheet is in every way similar to the separable sheet shown in Fig. 3 except that the marginal portions originally connecting the sections or strips beyond the incisions are missing. The sheet thus reassembled may now be duplicated by transferring it first to a gelatin bed and printing as many copies as are desired from the gelatin bed in accordance with the hectographic process of duplicating.

The separation of the separable sheets into individual strips may be carried out in various ways such as by clamping or otherwise securing in the aligned position a stack of separable sheets and cutting off the marginal portions thereof by means of a conventional cutting machine. To facilitate handling and copying of these strips, I employ a pegging apparatus of special character, illustrated in Figs. 7 to 12.

Referring now more particularly to Figs. 7 to 12, the pegging apparatus of the invention comprises a metal frame constituted of two transverse plates 50 and 51 held together in a parallel-spaced position by means of two spacing rods or bolts 52 and 53. I provide two shafts 54 and 55 pivotally mounted in plates 50 and 51 having one of their ends weakened and inserted into a corresponding hole in plate 51 and their other end extending through a hole of larger diameter in plate 50. Both of these shafts have a row of pegs 56 inserted therein, said pegs having the same spacing as the holes in the separable sheets. Likewise, the distance between the corresponding pegs of the two shafts in the vertical position thereof is approximately the same as the distance between the two holes of the same strip. Shafts 54 and 55 may be rotated or turned by means of a lever or arm mounted at the ends thereof extending through plate 50. One of these turning devices shown in Fig. 10 comprises a lever 57 rigidly connected to shaft 54 to form a crank arm, the other end of which is shaped as a sleeve 58 and has a pin 59 locked therein adapted to be slidably displaced against the pressure of a helical spring 60 to a limited extent. One end of pin 59 extends beyond sleeve 58 and is adapted to protrude into a corresponding hole 61 in plate 50 for locking the shaft in one of its predetermined positions while its other end has a knurled sleeve 62 rotatably mounted thereon adapted to form a convenient handle for the actuation or rotation of shaft 54. Thus, it will be noted that shaft 54 can be readily rotated to a limited extent and may be locked in a position in which the pegs on the shaft are in an inclined and upwardly turned position.

The structure at the end of shaft 55 and illustrated in Figs. 11 and 12 is similar to the one described in the foregoing with the difference, however, that a cushioning effect is incorporated therein. As it will be noted from Fig. 11, the end of shaft 55 has an arm or plate 63 rigidly mounted thereon. The end of shaft 55 also has a screw 64 inserted therein which forms a pivot for one end of a crank arm 65 similar in construction to crank arm 57 shown in Fig. 10 and having a resiliently slidable pin inserted therein in the same way. A plurality of holes 66 are provided in a circle around shaft 55 and are adapted to be selectively engaged by the end of pin 59. Crank arm 65 can be freely rotated around screw 64 and has a helical spring 66 connecting it with a small pin on arm 63 whereby arm 63 and crank arm 65 are resiliently connected with each other.

From the foregoing description, the operation of the pegging machine will be obvious. First of all, both crank arms 57 and 65 are fixed in such positions in which pegs 56 therein are directed in an inclined and upward direction as shown in Fig. 9. Hereafter, the strips of a group or stack of strips obtained from the cutting machine are one by one inserted between the pegs of the shafts in the proper order as they are supposed to appear in the finished second report sheet. On top of these strips a wider strip 67 containing the captions may be inserted and, if desired, a lowermost strip, (not shown), upon which the totals obtained from the rearranged strips appear. After all of these strips are in their proper respective position, crank handles 57 and 63 are turned to the left and to the right, respectively, until the strips are held in a taut position, as is shown in Fig. 8, and the crank arms are fixed in this position by means of inserting pins 59 in holes 61 and 66, respectively. It will be noted that due to the cushioning effect provided by spring 66, the strips will be held at the proper tension, and both undue slackness of the strips or tearing of the strips by excessive tensioning are positively excluded. It will be noted particularly from Fig. 8 that the surface of the rearranged strips on the pegging machine forms what is in effect a continuous surface which may be applied against the gelatin bed of a hectographic duplicating machine. The gelatin bed will absorb some of the hectographic ink of the data recorded on the strips so that a number of copies may be printed therefrom in accordance with the conventional process of hectographic duplication.

It will be noted that the devices and the instrumentalities embodying the present invention provide important advantages. Thus, first of all, the separable sheets of the invention are extremely simple and inexpensive in character and may be manufactured by means of conventional printing processes.

It is also to be observed that the separable sheets of the invention are completely flat in character and can be handled and stored like an integral record sheet or card.

Moreover, the devices of the invention such as the cutting machine and the pegging device permit handling the separable sheets including separation into strips, rearrangement into secondary reports, copying, and the like, in an almost completely automatic manner so that the desired reports may be compiled by untrained operators and the occurrence of errors is almost positively excluded.

The present invention is a division of my copending application, Serial No. 321,151, filed February 28, 1940, and entitled Statistical unit.

Although the present invention has been disclosed in connection with a preferred embodiment thereof, variations and modifications may be resorted to by those skilled in the art without departing from the principles of the present invention. Thus, instead of providing the various entries on the primary sheet, and transferring such entries by means of a hectographic transfer sheet to a separable sheet, the entries may be directly made on the separable sheet. Likewise, it is possible to dispense with the prediecut horizontal slits in the second or separable sheet, as the same result may be accomplished by a final operation in the central office where the secondary sheets may be cut into strips of single-line width by means of a suitable cutting machine. I consider all of these variations and modifications as within the true spirit and scope of the present invention as disclosed in the foregoing description and defined by the appended claims.

I claim:

1. In a pegging machine for assembling a plurality of paper strips bearing unitary intelligence into a statistical table, the combination which comprises a frame, a pair of shafts rotatably mounted in said frame in parallel-spaced position, a row of pegs on each of said shafts conforming to the spacing of and the distance between holes provided in said strips, means for rotating said shafts to tension said strips and to displace said pegs into a position wherein they are below the surface presented by said tensioned strips, means for locking said shafts in a plurality of positions, and resilient means operatively associated with said rotating and said locking means to maintain the maximum of tension imparted to said strips within predetermined limits.

2. In a pegging machine for assembling a plurality of paper strips bearing unitary intelligence, the combination which comprises a frame, a pair of shafts rotatably mounted in said frame in parallel-spaced position, a row of pegs on each of said shafts conforming to the spacing of and the distance between holes provided in said strips, means for rotating said shafts to tension said strips and to displace said pegs into a position wherein they are below the surface presented by said tensioned strips, means for locking said shafts in a plurality of positions corresponding to different degrees of tension in said strips, means for rendering said locking means temporarily inoperative, and cushioning means interposed between said rotating and said locking means to prevent excessive tensioning of said strips.

3. In a device for holding a plurality of sheets of paper for receiving copyable intelligence in predetermined relative positions, the combination which comprises a pair of spaced peg-supporting members, a row of pegs on each of said members conforming to the spacing of and the distance between holes provided in the marginal portions of at least one sheet of paper, and means for rotationally displacing said members to tension said sheet and to move said pegs into a position wherein they are below the surface presented by said tensioned sheet.

4. In a device for holding a plurality of strips bearing unitary copyable intelligence in predetermined relative positions and in a single plane, the combination which comprises a pair of spaced peg-supporting members, a row of pegs on each of said members conforming to the spacing of and the distance between holes provided in said strips, means for rotationally displacing said peg-supporting members to tension said strips and to move said pegs into a position wherein they are below the surface presented by said tensioned strips, and means for locking said peg-supporting members in such position.

5. In a device for holding a plurality of strips bearing unitary copyable intelligence in predetermined relative positions and in a single plane, the combination which comprises a frame, a pair of parallel-spaced shafts rotatably mounted in said frame, a row of pegs on each of said shafts conforming to the spacing of and the distance between holes provided in said strips, means for rotating said shaft to tension said strips and to displace said pegs into a position wherein they are below the surface presented by said tensioned strips, and means for locking said shafts in such position.

6. In a pegging machine for holding in predetermined relative arrangement a plurality of paper strips bearing intelligence in copyable script, the combination which comprises a frame, a pair of shafts rotatably mounted in said frame, a plurality of pegs on each of said shafts adapted to engage holes provided in said strips, a crank arm at one end of each shaft for rotating said shafts in opposite directions to cause tensioning said strips and displacement of the pegs into a non-obstructing position below the plane defined by the tensioned strips, and means for locking said cranks in such position whereby said tensioned strips will collectively present a single unobstructed planar surface from which copyable matter may be transferred to another planar surface by pressure contact.

7. In a device for holding a plurality of strips bearing unitary copyable intelligence in predetermined relative position and in a single plane, the combination comprising a pair of groups of spaced strip-holding members, each of the members of one of said groups being adapted to engage a hole in one end of one of said strips and each of the members of the other of said groups being adapted to engage a hole in the other end of one of said strips, means for collectively and rotationally displacing said groups of strip-holding members in opposite directions to tension said strips and to move said members below the plane defined by the tensioned strips, and means for locking said groups of strip-holding members in such position whereby said tensioned strips will collectively present a single unobstructed planar surface from which copyable matter may be transferred to another planar surface by pressure contact.

EDWIN A. GODLEY.